United States Patent
Shi (10) Patent No.: US 10,977,049 B2
(45) Date of Patent: Apr. 13, 2021

(54) INSTALLING OF OPERATING SYSTEM (71) Applicant: New H3C Information Technologies Co., Ltd., Hangzhou (CN)

(72) Inventor: Feng Shi, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 177 days.

(21) Appl. No.: 16/090,038

(22) PCT Filed: Apr. 11, 2017

(86) PCT No.: PCT/CN2017/080066
§ 371 (c)(1),
(2) Date: Sep. 28, 2018

(87) PCT Pub. No.: WO2017/177892
PCT Pub. Date: Oct. 19, 2017

(65) Prior Publication Data
US 2019/0114178 A1  Apr. 18, 2019

(30) Foreign Application Priority Data
Apr. 11, 2016 (CN) .......................... 201610223429.6

(51) Int. Cl.
*G06F 9/44* (2018.01)
*G06F 9/4401* (2018.01)
(Continued)

(52) U.S. Cl.
CPC .............. *G06F 9/4406* (2013.01); *G06F 8/63* (2013.01); *G06F 9/4416* (2013.01); *H04L 67/34* (2013.01)

(58) Field of Classification Search
CPC ..................................... G06F 1/32; G06F 9/44
See application file for complete search history.

(56) References Cited

U.S. PATENT DOCUMENTS

2003/0007635 A1   1/2003  Li et al.
2007/0006220 A1*  1/2007  Han .......................... G06F 8/61
                                                                   717/174
(Continued)

FOREIGN PATENT DOCUMENTS

CN    103324474 A    9/2013
CN    104199683 A    12/2014
(Continued)

OTHER PUBLICATIONS

State Intellectual Property Office of the People's Republic of China, Office Action and Search Report Issued in Application No. 201610223429.6, dated Apr. 12, 2019, 11 pages. (Submitted with Partial Translation).
(Continued)

*Primary Examiner* — Keshab R Pandey
(74) *Attorney, Agent, or Firm* — McCoy Russell LLP (57) ABSTRACT

A method and apparatus of installing an operating system are provided. According to an example of the method, a server reads an image file of an operating system from a system providing device, wherein the image file comprises address information corresponding to an automatic response script file, and the automatic response script file is not stored at a position corresponding to the address information. The server receives the automatic response script file provided by the system providing device in response to that the reading by the server advances to the position corresponding to the address information. The server installs the operating system by using the automatic response script file.

10 Claims, 9 Drawing Sheets

(51) Int. Cl.
*G06F 8/61* (2018.01)
*H04L 29/08* (2006.01)

(56) References Cited

U.S. PATENT DOCUMENTS

| | | | |
|---|---|---|---|
| 2007/0261051 A1* | 11/2007 | Porter | G06F 21/554 |
| | | | 717/174 |
| 2008/0244619 A1* | 10/2008 | Jeon | G06F 9/4415 |
| | | | 719/321 |
| 2008/0288938 A1 | 11/2008 | DeHaan | |
| 2009/0106753 A1* | 4/2009 | Wang | G06F 8/60 |
| | | | 717/176 |
| 2010/0293201 A1* | 11/2010 | Thergaonkar | G06F 8/65 |
| | | | 707/803 |
| 2012/0311450 A1 | 12/2012 | Gupta | |
| 2013/0254759 A1 | 9/2013 | Xu et al. | |
| 2014/0215259 A1* | 7/2014 | Crabtree, Jr. | G06F 11/1484 |
| | | | 714/4.11 |
| 2014/0259008 A1 | 9/2014 | Bhattiprolu et al. | |

FOREIGN PATENT DOCUMENTS

| | | |
|---|---|---|
| CN | 104850437 A | 8/2015 |
| CN | 104850438 A | 8/2015 |
| CN | 104850442 A | 8/2015 |
| CN | 104866344 A | 8/2015 |
| JP | H10267857 A | 10/1998 |
| JP | 2005107851 A | 4/2005 |
| JP | 2006155393 A | 6/2006 |
| JP | 2011060035 A | 3/2011 |
| JP | 2014215823 A | 11/2014 |

OTHER PUBLICATIONS

Japanese Patent Office, Office Action Issued in Application No. 2018-554340, dated Oct. 15, 2019, 6 pages. (Submitted with Machine Translation).

ISA State Intellectual Property Office of the People's Republic of China, Written Opinion of the International Searching Authority Issued in Application No. PCT/CN2017/080066, dated Jun. 29, 2017, WIPO, 3 pages.

European Patent Office, Extended European Search Report Issued in Application No. 17781868.9, dated Mar. 22, 2019, Germany, 8 pages.

ISA State Intellectual Property Office of the People's Republic of China, International Search Report Issued in Application No. PCT/CN2017/080066, dated Jun. 29, 2017, WIPO, 4 pages.

State Intellectual Property Office of the People's Republic of China, Office Action and Search Report Issued in Application No. 201610223429.6, dated Dec. 25, 2019, 8 pages. (Submitted with Machine Translation).

Japanese Patent Office, Office Action Issued in Application No. 2018-554340, dated Jan. 28, 2020, 6 pages. (Submitted with Machine Translation).

European Patent Office, Office Action Issued in Application No. 17781868.9, dated Mar. 24, 2020, Germany, 4 pages.

State Intellectual Property Office of the People's Republic of China, Office Action and Search Report Issued in Application No. 201610223429.6, dated Jun. 2, 2020, 7 pages. (Submitted with Machine Translation).

European Patent Office, Office Action Issued in Application No. 17781868.9, dated Dec. 8, 2020, Germany, 8 pages.

* cited by examiner

| The server may read an image file of operating system from a system providing device, wherein the image file comprises address information of an automatic response script file, and the automatic response script file is not stored at the position corresponding to the address information | 601 |

| The server may receive the automatic response script file which is provided by the system providing device in response to that the reading by the server advances to the position corresponding to the address information, and install the operating system by using the automatic response script file | 602 |

INSTALLING OF OPERATING SYSTEM

CROSS REFERENCE TO RELATED APPLICATIONS

This present application is a U.S. National Phase of International Patent Application Serial No. PCT/CN2017/080066 entitled "INSTALLATION OF OPERATING SYSTEM," filed on Apr. 11, 2017. International Patent Application Serial No. PCT/CN2017/080066 claims priority to Chinese Patent Application No. 201610223429.6 filed on Apr. 11, 2016. The entire contents of each of the above-cited applications are hereby incorporated by reference in their entirety for all purposes.

BACKGROUND

A large number of servers may be deployed in a data center, for example, there are usually thousands of servers deployed. Therefore, the workload to install an Operating System (OS) on each of servers is heavy. In order to reduce the workload, a server may automatically install the OS to reduce the cost of human resources. For example, a Kickstart (KS) file as an automatic response script file may be configured for a server, and then how to install the OS may be determined based on the KS file, so as to achieve the purpose of automatically installing the OS.

In order to achieve the above automatic installing process, a KS file may be packaged into an image file of an operating system. In this way, the server may acquire the KS file from the image file after acquiring the image file of the operating system, and then how to install the OS may be determined based on the KS file.

However, since KS files corresponding to different servers may be different, it is required that different image files are generated for servers with different KS files. In this way, a plurality of image files will be generated. One image file may have a size of several G bytes, and therefore a plurality of image files will inevitably take up much storage space.

BRIEF DESCRIPTION OF THE DRAWINGS

In order to provide a clearer description of the technical solution in an example of the present disclosure, the following simple description will be made with reference to the accompanying drawings, and it will be apparent that the drawings described in the following description merely illustrate some examples described in the present disclosure. Those skilled in the art may also acquire other drawings in accordance with these drawings.

DETAILED DESCRIPTION OF THE EMBODIMENTS

According to examples in the present disclosure, a method of installing an operating system is provided, which may be applied to a system comprising a system providing device and a plurality of servers. An identical operating system may be installed on these servers, and the system providing device may be configured with an image file of the operating system and may provide the image file for each server so that each server may use the image file to install the operating system. And wherein, the system providing device may be a Personal Computer (PC) and the like.

Figure 1:
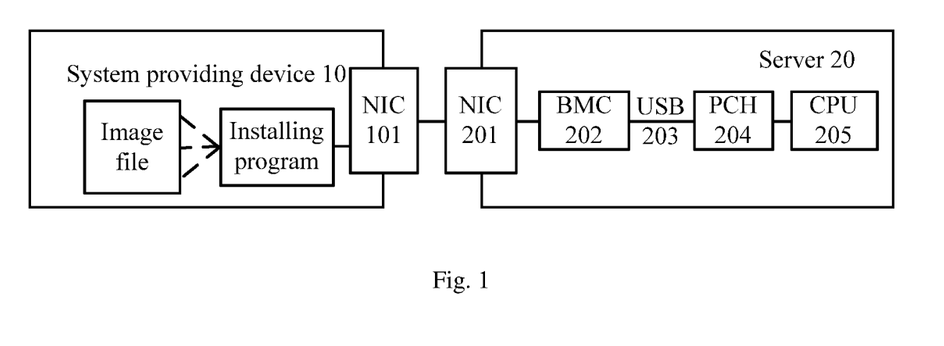
FIG. 1 is a schematic diagram of an application scenario of an example of the present disclosure.

FIG. 1 is a schematic diagram of an application scenario of an example of the present disclosure. The system providing device 10 may be connected to a Network Interface Card (NIC) 201 of the server 20 through a NIC 101. In the server 20, a Baseboard Management Controller (BMC) 202, a Platform Controller Hub (PCH, i.e., a South Bridge) 204, and a Central Processing Unit (CPU) 205 may be comprised. The BMC 202 may be connected to the NIC 201. The BMC 202 may be connected to the PCH 204 via a Universal Serial Bus (USB) interface 203, and the PCH 204 may be connected to the CPU 205.

In this application scenario, the system providing device 10 may mount the image file of the operating system to the BMC 202 of the server 20 via NICs 101 and 201, and the BMC 202 may provide the image file to the CPU 205 of the server 20 via the USB interface 203. Specifically, for example, a virtual USB optical drive may be inserted for the server 20, the CPU 205 may continuously read the data in the USB optical drive through the USB interface 203; the BMC 202 may continuously read the data from the system providing device 10 through a network; the system providing device 10 may continuously read the data in the image file and return the read data to the BMC 202; and the BMC 202 may return the data to the CPU 205 via the USB interface 203 so that the CPU 205 may use the image file to install the operation system.

The process that the BMC reads data from the system providing device is independent of the fact whether the server is installed with an operating system. Even if the server is not installed with an operating system, the BMC may also read data from the system providing device, and provide the data to a CPU in the server, so that the CPU may use the image file to install the operating system.

An image file of an operating system may be an ISO image file (i.e., a CD image file).

Figure 2:
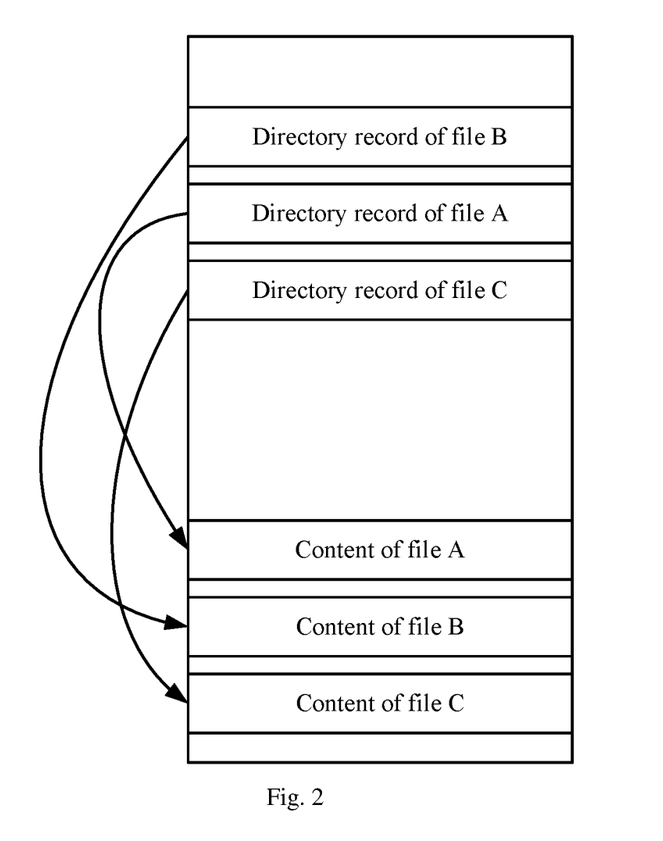
FIGS. 2 to 4 schematically illustrate an image file of an operating system in an example of the present disclosure.

FIG. 2 illustrates an example of an image file of an operating system. The image file may comprise a directory record of each file and content of each file. The directory record of the file may comprise but is not limited to information such as a file name, a file header address, a file size, etc. The file header address indicates the header address storing the content of the file, and the file size indicates the size of the content of the file.

For example, for the directory record of file A in FIG. 2, the file name is "Chinese language", the file header address is "address 1", the file size is "size 1", and the sum of address 1 and size 1 may be determined as address 2. The directory record may either record address 2 or not record address 2. The directory record of this example does not record address 2. Address 2 is introduced here to facilitate the subsequent description. Therefore, the content of file A is an installing program in Chinese language, and the address space where the content of file A is located is between address 1 and address 2. For the directory record of file B, the file name is "English language", the file header address is "address 3", the file size is "size 2", and the sum of address 3 and size 2 may be determined as address 4. Therefore, the content of file B is an installing program in English language, and the address space where the content of file B is located is between address 3 and address 4. For the directory record of file C, the file name is "WORD program", the file header address is "address 5", the file size is "size 3", and the sum of address 5 and size 3 may be determined as address 6. Therefore, the content of file C is a WORD installation program, and the address space where the content of file C is located is between address 5 and address 6.

Based on the above image file, the CPU of the server may first start to read data from some location of an image file. Assuming that the directory record of file B is read, the content of file B may be known as the installing program in English language. If the installing program in English language is not intended to be installed, the CPU may not read the content of file B between address 3 and address 4, and may continue to read the data following the address of the directory record of file B. Assuming that the directory record of file A is read, the content of file A may be known as the installing program in Chinese language. If the installing program in Chinese language is to be installed, the CPU may read the content of file A between address 1 and address 2. For example, the CPU may send a reading command carrying address 1 and size 1. The reading command is used to read the content of file A. Then, the CPU may use the content of file A to install the installing program in Chinese language, and may continue to read the data following the address of the directory record of file A. Assuming that the directory record of file C is read, the content of file C may be known as a WORD installing program. If the WORD installing program is to be installed, the CPU may read the content of file C between address 5 and address 6. For example, the CPU may send a reading command carrying address 5 and size 3. The reading command is used to read the content of file C. Then, the CPU may use the content of file C to install the WORD program, and the like.

On the basis of the directory records of the above image file, in an example of the present disclosure, an image file may also comprise address information corresponding to a KS file, and the KS file is not stored at the position corresponding to the address information. For example, the image file may comprise a directory record of the KS file, and the directory record may comprise the address information corresponding to the KS file. Further, the address information corresponding to the KS file may comprise the file header address and the file size corresponding to the KS file.

Figure 3:
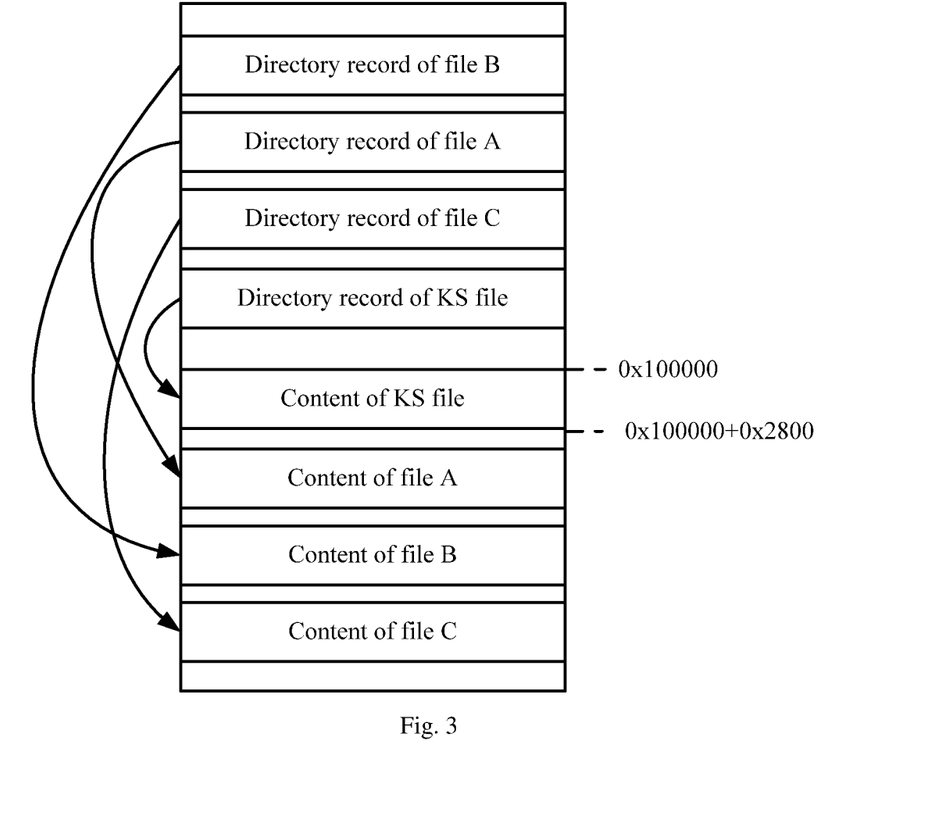
Figure 4:
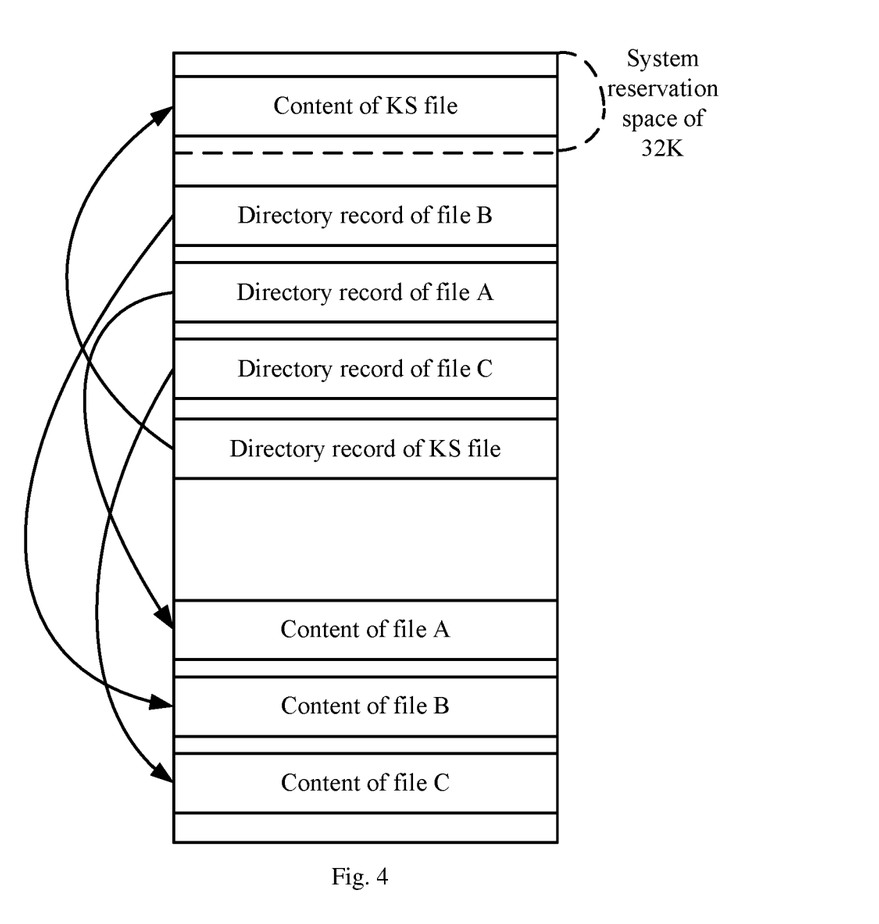

An example of an image file of an operating system of the present disclosure is as shown in FIG. 3 and FIG. 4. The image file comprises a directory record of a KS file and content of the KS file. The directory record of the KS file may comprise but is not limited to information such as a file name (i.e., KS file), a file header address, a file size, etc. The file header address indicates the header address storing the content of the KS file, and the file size indicates the size of the KS file. For example, the file header address is "address 7", and the file size is "size 4". In addition, the sum of address 7 and size 4 may be determined as address 8 (address 8 may be referred to as a file tail address), that is, the address space where the content of KS file is located is between address 7 and address 8. In addition, address 8 is introduced in this example to facilitate the description. The directory record of the KS file may not record address 8.

Unlike file A, file B, and file C described above, the content of KS file is empty, that is, the content of the KS file is not packaged into the image file. The address space between address 7 (file header address) and address 8 (file tail address) is only occupied by the KS file and does not actually store the KS file.

In practical applications, although the file sizes of different KS files are different, KS file is a text file, and not large in size. Therefore, it is not required that the file size of each KS file is known. As long as the file size of the maximum KS file is known, an address space with a specified size (such as 10 KB) may be reserved. The specified size may be greater than or equal to the file size of the maximum KS file. For example, the address space between address 7 and address 8 is the specified size, and the file size in the above directory record may be the specified size. In this way, it may be ensured that the server may read the full KS file when reading the data of the address space with the specified size, and the specific reading process is described in the subsequent process.

The size of the content of the above file A is the size 1 of the address space between address 1 and address 2. The size of the content of file B is the size 2 of the address space between address 3 and address 4, and the size of the content of file C is the size 3 of the address space between address 5 and address 6. In contrast, the size of the address space between address 7 and address 8 is the specified size (hereinafter also referred to as file size 4). The specified size is not necessarily equal to the actual size of KS file. The specified size may be selected according to the actual situation and specified when the image file is generated.

In one example, the specified size may be 10 KB, and the file header address (address 7) of a KS file may be 0x100000. Based on this, the file tail address (address 8) of the KS file may be 0x100000+0x2800.

In FIG. 4, the address space between address 7 and address 8 may be a system reservation space. For convenience of reading, the system reservation space may usually be located at the header or tail of an image file. In an example of the present disclosure, the system reservation space is not used. Or the system reservation space may be used to store the content of a KS file. The size of a system reservation space may be 32 KB, which is usually larger than the actual file size of a KS file.

The image file may be understood as a compressed file, and the compressed file may contain a plurality of files and directory records respectively pointing to each file. For example, the image file may contain file A, file B, file C, KS file, and the directory record of the file A, the directory record of the file B, the directory record of the file C, and the directory record of the KS file.

In an example of the present disclosure, since a real KS file is not packaged into an image file, the KS file may be stored on a system providing device in order to provide the KS file to a server. Because KS files of different servers may be different, in order to distinguish the KS files of different servers, a mapping relationship between the identification information (such as IP address, name, etc.) of each server and the KS file corresponding to the server may be established.

When a plurality of servers use the same KS file, a system providing device may maintain the mapping relationship between the identification information of the plurality of servers and the KS file; or when a plurality of servers use different KS files, the system providing device may maintain the mapping relationship between the identification information of each server and its corresponding KS file, respectively.

Figure 5:
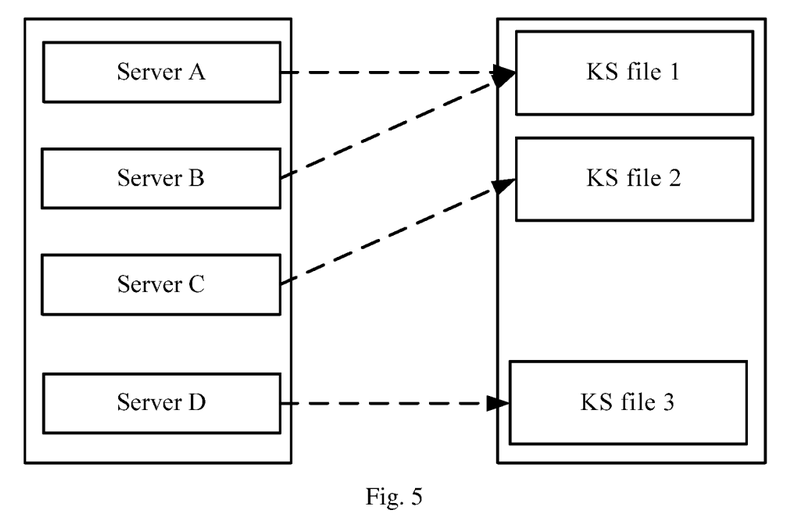
FIG. 5 schematically illustrates a mapping relationship between server and KS file in an example of the present disclosure.

FIG. 5 illustrates an example of a mapping relationship between server and KS file. Assuming that server A and server B use the same KS file, a system providing device may generate KS file 1 for server A and server B and maintain the mapping relationship between server A, server B, and KS file 1. Assuming that server C uses a KS file separately, the system providing device may generate KS file 2 for server C and maintain the mapping relationship between the server C and the KS file 2. Assuming that server D uses a KS file separately, the system providing device may generate KS file 3 for server D and maintain the mapping relationship between the server D and the KS file 3.

The system providing device may generate a KS file according to the configuration information set by an administrator for a server. For example, the configuration information may be password information, partition information, partition size information, and the like. Of course, the configuration information is not limited to this. In fact, all the options that need to be entered manually by a user during system installing process may be used as configuration information, and the generated KS file may comprise the configuration information. In the system installing process, the administrator may be required to enter password information to confirm whether the administrator has the authority to install the operating system; the administrator may also possibly be required to enter the partition information, for example three hard drives, such as hard drive C, hard drive D, and hard drive E, are partitioned, where hard drive C is a system disk; and the administrator may also be possibly required to enter the partition size information, for example the hard drive C has a size of 80 GB, hard drive D has a size of 120 GB, hard drive E has a size of 300 GB and the like.

According to the method of installing the operating system proposed in an example of the present disclosure, the configuration information is the password information may be taken as an example. Assuming that the password information that an administrator sets for server A and server B is 123456, during the system installing process of server A or server B, the password 123456 may be automatically entered based on KS file 1 generated by the system providing device in place of the administrator. Assuming that the password information set by the administrator for server C is 123123, during the system installing process of server C, the password 123123 may be automatically entered based on KS file 2 generated by the system providing device in place of the administrator.

Figure 6:
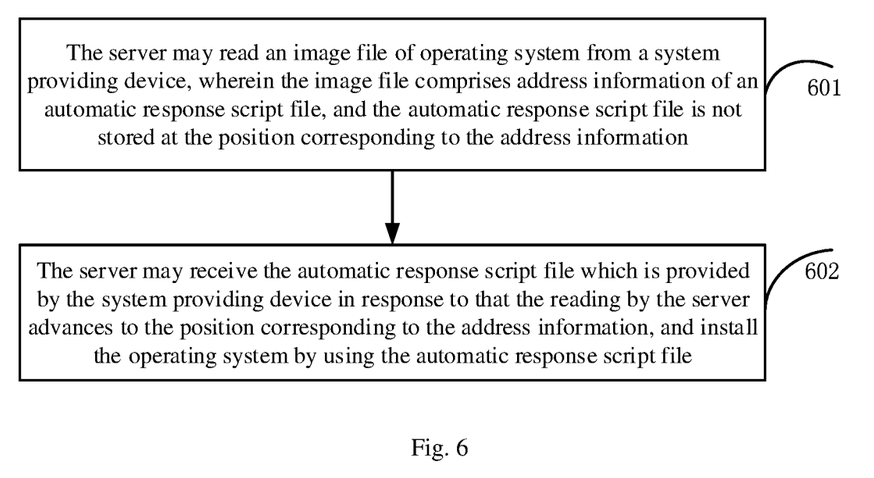
FIG. 6 is a flow diagram of a method of installing operating system in an example of the present disclosure.

Based on the above application scenario, referring to FIG. 6, the method of installing operating system proposed in an example of the present disclosure may be applied to a server, and the method of installing operating system may comprise the following blocks.

At block 601, the server may read an image file of operating system from a system providing device, wherein the image file comprises address information of an automatic response script file, and the automatic response script file is not stored at the position corresponding to the address information.

For example, the image file may comprise a directory record of a KS file, and the directory record may comprise address information corresponding to the KS file. Further, the address information corresponding to the KS file may comprise the file header address and the file size corresponding to the KS file. Refer to FIG. 3 and FIG. 4 described above for details.

At block 602, the server may receive the automatic response script file which is provided by the system providing device in response to that the reading by the server advances to the position corresponding to the address information, and uses the automatic response script file to install the operating system.

In an example of the present disclosure, the process of acquiring an automatic response script file from a system providing device may comprise, but is not limited to, the following manner: a server may send identification information of the server and the current reading position information to the system providing device when reading an image file; the system providing device may acquire the automatic response script file corresponding to the identification information when determining that the reading by the server is advancing to the position corresponding to the address information according to the current reading position information. Further, after the system providing device acquires the automatic response script file, the server may acquire the automatic response script file corresponding to the identification information from the system providing device.

In the above example, the system providing device may return the automatic response script file to the server when the server is reading the position corresponding to the address information. However, in practical applications, it is not limited to the above manner. For example, the system providing device may take the initiative to send the automatic response script file to the server at any time, which will not be repeated.

Based on the above technical solution, in an example of the present disclosure, a mapping relationship between a server and an automatic response script file may be maintained on a system providing device, rather than storing the automatic response script file in an image file of the operating system. In this way, when the server installs the operating system, the system providing device may provide, to the server, the automatic response script file corresponding to the server according to the mapping relationship between the server and the automatic response script file, and then the server may use the automatic response script file to install the operating system. Based on this, when different servers have different automatic response script files, it is not required to generate different image files, and only one image file may be generated for all servers, which reduces the number of image files, prevents a plurality of image files from taking up much storage space, thereby saving storage space.

Figure 7:
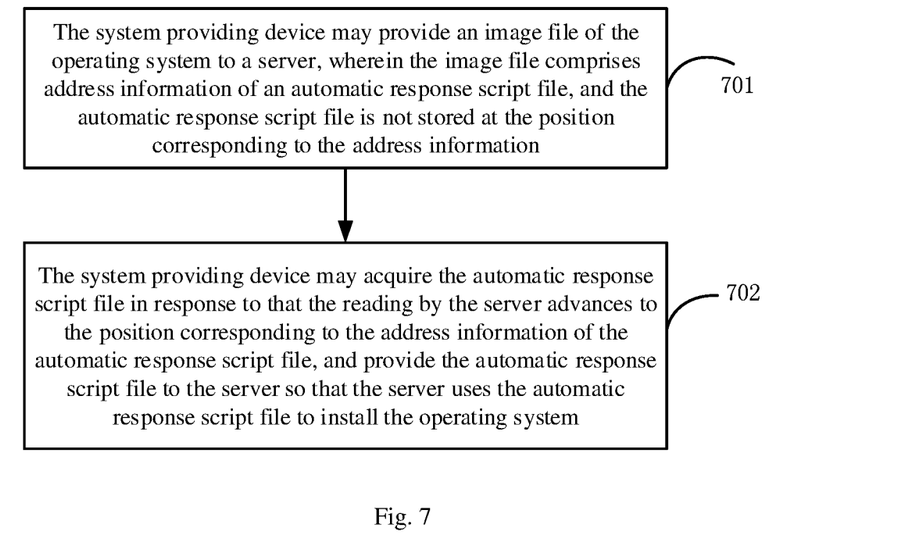
FIG. 7 is a flow diagram of a method of installing operating system in another example of the present disclosure.

Referring to FIG. 7, a method of installing operating system proposed in an example of the present disclosure may be applied to a system providing device, and the method of installing operating system may comprise the following blocks.

At block 701, the system providing device may provide an image file of the operating system to a server, wherein the image file comprises address information of an automatic response script file, and the automatic response script file is not stored at the position corresponding to the address information.

And wherein, the image file may comprise a directory record of KS file, and the directory record may comprise address information corresponding to the KS file. Further, the address information corresponding to the KS file may comprise the file header address and the file size corresponding to the KS file. Refer to FIG. 3 and FIG. 4 described above for details.

At block 702, the system providing device may acquire the automatic response script file in response to that the reading by the server advances to the position corresponding to the address information of the automatic response script file, and provide the automatic response script file to the server so that the server uses the automatic response script file to install the operating system.

In an example of the present disclosure, the process of acquiring the automatic response script file in response to that the reading by the server advances to the position corresponding to the address information of the automatic response script file may specifically comprise, but is not limited to, the following manner: the system providing device may determine whether the reading by the server is advancing to the position corresponding to the address information (i.e., the position corresponding to the address information of the automatic response script file) based on identification of the server and the current reading position information which are received from the server. If so, the system providing device may acquire the automatic response script file corresponding to the identification information according to the mapping relationship between the server and the automatic response script file. If not, the existing flow may be used to send the data in the image file corresponding to the current reading position information to the server.

Of course, the actual application is not limited to the above manner of acquiring the automatic response script file. For example, a system providing device may take the initiative to send KS file to a server at any time, rather than sending the KS file to the server when determining that the reading by the server is advancing to the position corresponding to the address information, which will not be repeated.

The process of determining whether the reading by a server is advancing to the position corresponding to address information according to current reading position information may specifically comprise, but is not limited to, the following manner. The system providing device may use the current reading position information to acquire an offset header address and the content length of the currently read content. The system providing device may determine that the reading by the server is advancing to the position corresponding to the address information when the offset header address is greater than or equal to the file header address and the sum of the content length and the offset header address is equal to or less than the sum of the file header address and the file size.

Based on the above technical solution, in an example of the present disclosure, a mapping relationship between a server and an automatic response script file may be maintained on a system providing device, rather than storing the automatic response script file in an image file of operating system. In this way, when the server installs the operating system, the system providing device may provide, to the server, the automatic response script file corresponding to the server according to the mapping relationship between the server and the automatic response script file, and the server may use the automatic response script file to install the operating system. Based on this, when different servers have different automatic response script files, it is not required to generate different image files for servers with different automatic response script files. Only one image file may be generated for all servers, reducing the number of image files, preventing a plurality of image files from taking up much storage space, thereby saving storage space.

Figure 8:
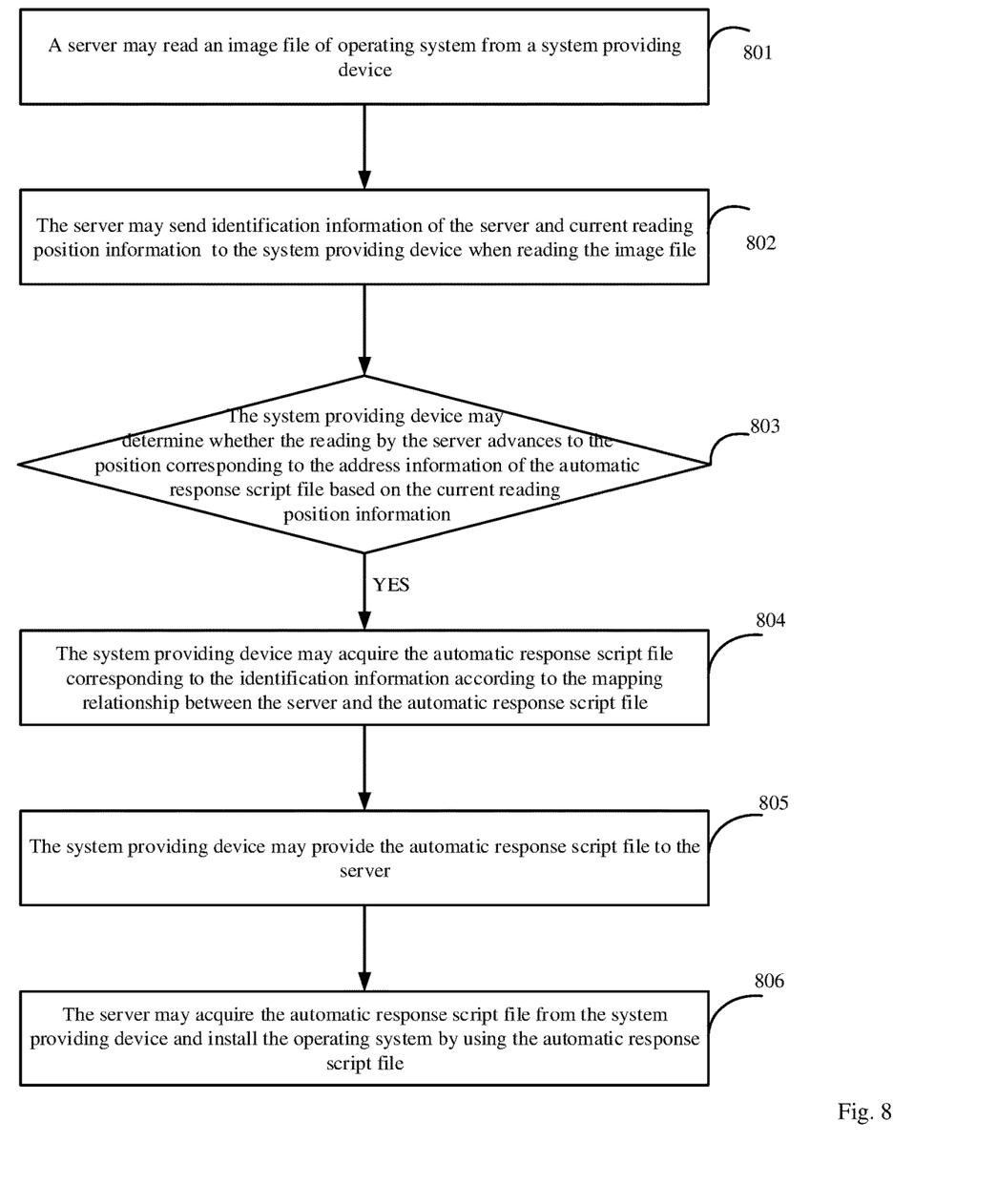
FIG. 8 is a flow diagram of a method of installing operating system in still another example of the present disclosure.

Referring to FIG. 8, a method of installing operating system proposed by the present disclosure may comprise the following blocks.

At block 801, a server may read an image file of operating system from a system providing device.

And wherein, the system providing device may mount the image file of the operating system to the BMC of the server via NIC. The BMC may provide the image file to the CPU of the server via the USB interface so that a virtual USB optical drive is inserted for the server. The CPU may continuously read the data in the USB optical drive through the USB bus, and the BMC may continuously read the data from the system providing device through the network. The system providing device may continuously read the data in the image file and return the read data to the BMC. The BMC may return the data to the CPU. In this way, the CPU of the server may read the image file from the system providing device.

In an example of the present disclosure, the directory record of an image file is shown in FIG. 3 and FIG. 4. The image file may comprise address information corresponding to the automatic response script file, and the automatic response script file is not stored at the position corresponding to the address information. For example, the image file may comprise a directory record of the KS file, and the directory record may comprise address information corresponding to the KS file. Further, the address information corresponding to the KS file may comprise the file header address and the file size corresponding to the KS file.

In a specific example, a file header address of KS file may be 0x100000 and a file size may be 0x2800. Based on this, a file tail address may be 0x100000+0x2800, and the KS file is not stored in the address space defined by the file header address and the file size, that is, the KS file is not stored between the address 0x100000 and the address 0x100000+0x2800.

At block 802, the server may send the identification information of the server and the current reading position information to the system providing device when reading the image file.

And wherein, the process that the server reads the image file of the operating system is actually performed in the following manner, rather than reading all the content of the image file directly from the system providing device. That is, the CPU may continuously read the data in the USB optical drive through the USB bus, and the BMC may continuously read the data from the system providing device through the network. The system providing device may continuously read the data in the image file and return the read data to the BMC. The BMC may return the data to the CPU. The process is the procedure during which the server reads the image file.

In the process that a server reads an image file, assuming that the server needs to read the data between address 1 and address 2, the reading command carrying the identification information of the server and address 1 and size 1 may be sent to the system providing device so that the system providing device returns the data between address 1 and address 2. Assuming that the server needs to read the data between address 7 and address 8, the reading command carrying the identification information of the server and address 7 and size 4 may be sent to the system providing device so that the system providing device may return the data between address 7 and address 8.

At block 803, the system providing device may determine whether the reading by the server is advancing to the position corresponding to the address information of the automatic response script file based on the identification information and the current reading position information which are received from the server. If so, block 804 may be performed, and if not, the system providing device may use the existing flow to send the data in the image file corresponding to the current reading position information to the server.

For example, if the current reading position information is address 1 and size 1, the system providing device may determine that the reading by the server has not advanced to the position corresponding to the address information corresponding to the KS file. Thus, the system providing device may send the data between address 1 and address 2 (sum of address 1 and size 1) to the server corresponding to the identification information. For another example, if the current reading position information is address 7 and size 4, the system providing device may determine that the reading by the server is advancing to the position corresponding to the address information corresponding to the KS file. Thus, the system providing device may perform block 804 and subsequent blocks. The system providing device may send the KS file to the server corresponding to the identification information, rather than sending the data (in fact, the data in this part of space is empty) between address 7 and address 8 (sum of address 7 and size 4) to the server corresponding to the identification information.

In an example of the present disclosure, the process that the system providing device determines whether the reading by the server is advancing to the position corresponding to the address information of the automatic response script file based on the identification information and the current reading position information which are received from the server may specifically comprise, but is not limited to, the following manner. The system providing device may acquire the offset header address and the content length of the currently read content using the current position information. The system providing device may determine that the reading by the server is advancing to the position corresponding to the address information when the offset header address is greater than or equal to the file header address and the sum of the content length and the offset header address is equal to or less than the sum of the file header address and the file size.

And wherein, the header address of server request data may be referred to as the offset header address and the size of the request data may be referred to as the content length in order to be distinguished from the file header address and the file size of the automatic response script file.

In one example, when the offset header address is equal to the file header address of the KS file and the sum of the content length and the offset header address is equal to the sum of the file header address and the file size of the KS file, it indicates that the server sends the command to read the KS file to the system providing device.

In another example, in order to read the data between the file header address and the file tail address of the KS file, the server may also be allowed to send commands for a plurality of times. For example, the offset header address carried in command 1 is equal to address 7, the carried content length 1 is smaller than size 4, the offset tail address is equal to address 9 (between address 7 and address 8), the offset header address carried in command 2 is equal to address 9, content length 2 is equal to the difference of size 4 and content length 1, and the offset tail address is equal to address 8. Based on this, both command 1 and command 2 are the commands to read the KS file, and the offset header address carried in command 1 is equal to the file header address, and the sum of the content length and the offset header address is smaller than the sum of the file header address and the file size, the offset header address carried in command 2 is greater than the file header address, and the sum of the content length and the offset header address is equal to the sum of the file header address and the file size. In consideration of this, when the offset header address is greater than or equal to the file header address, the sum of the content length and the offset header address is equal to or less than the sum of the file header address and the file size, it indicates that the server sends the command to read the KS file to the system providing device.

At block 804, the system providing device may acquire the automatic response script file corresponding to the identification information (i.e., the identification information of the server received in block 803) according to the mapping relationship between the server and the automatic response script file.

For example, after receiving the identification information of server A, the system providing device may acquire KS file 1 corresponding to the identification information of server A according to the mapping relationship shown in FIG. 5. For another example, after receiving the identification information of server C, the system providing device may acquire KS file 2 corresponding to the identification information of server C according to the mapping relationship shown in FIG. 5.

At block 805, the system providing device may provide the automatic response script file to the server.

And wherein, when the system providing device has received the command to read the KS file, the system providing device may read KS file corresponding to the identification information of the server from KS files stored locally, rather than reading the data from the address space that the address information (the file header address and the file size) of the KS file points to (this part of address space is empty), and provide the KS file to the server.

The system providing device may provide KS file 1 to server A as an example. When the system providing device has received the command to read the data between the file header address and the file tail address of KS file 1 (the sum of the file header address and the file size), assuming that the offset header address is equal to the file header address and the content length is equal to the file size, it indicates that the server needs to read the data of the specified size (such as 10 KB). In fact, the size of KS file 1 is usually smaller than the specified size. Based on this, in an example of the present disclosure, the system providing device may directly provide KS file 1 to server A, and may add a null data to KS file 1 to acquire data with the specified size containing KS file 1 and provide the data to server A, wherein the null data has the length of the specified size minus the size of KS file 1.

And wherein, the null data having the length of the specified size minus the size of KS file 1 may be added following KS file 1, or added before KS file 1.

As an example, the system providing device may provide KS file 1 to server A. When the system providing device has received command 1 to read the data between the file header address and the file tail address of KS file 1, assuming that the offset header address is equal to the file header address, the content length is equal to length 1, and the length 1 is smaller than the file size, it indicates that the server needs to read KS file 1 in multiple times and will eventually read the data of the specified size, and the size of KS file 1 is usually smaller than the specified size. Based on this, in an example of the present disclosure, assuming that the size of KS file 1 is equal to or greater than length 1, data 1 of length 1 is read from KS file 1, and then provided to server A. Assuming that the size of KS file 1 is smaller than length 1, KS file 1 may be provided to server A, and a null data having the length of length 1 minus the size of KS file 1 may be added to KS file 1. If the null data is added following KS file 1, or the null data is added before KS file 1, data of length 1 containing KS file 1 may be acquired and then provided to server A.

When the system providing device has received command 2 to read the data between the file header address and the file tail address of KS file 1, assuming that the offset header address is equal to address 9 (greater than the file header address and is the sum of address 7 and length 1) and the content length is equal to length 2 (the sum of length 1 and length 2 is equal to the file size), it indicates that a part or all of the content of KS file 1 has been previously provided to server A. Assuming that all of the content of KS file 1 has been previously provided to server A, the system providing device may generate a null data of length 2 and provide the data to server A. Assuming that a part of the content of KS file 1 has been previously provided to server A, the remaining part of KS file 1 is data 2. If the size of data 2 is equal to or greater than length 2, the data of length 2 may be read from data 2, and then provided to server A. Assuming that the size of data 2 is smaller than length 2, data 2 in KS file 1 may be provided to server A, and a null data having the length of length 2 minus the size of data 2 may be added to data 2. For example, the null data may be added following data 2, or the null data may be added before data 2, a data of length 2 containing data 2 in KS file 1 may be acquired and then provided to server A.

At block 806, the server may acquire the automatic response script file from the system providing device and may install the operating system by using the automatic response script file. Of course, the server may use the automatic response script file and the image file together to install the operating system.

Based on the above technical solution, in an example of the present disclosure, a mapping relationship between a server and an automatic response script file may be maintained on a system providing device, rather than storing the automatic response script file in an image file of the operating system. In this way, when the server installs the operating system, the system providing device may provide, to the server, the automatic response script file corresponding to the server according to the mapping relationship between the server and the automatic response script file, and the server may use the automatic response script file to install the operating system. Based on this, when different servers have different automatic response script files, it is not required to generate different image files. Only one image file may be generated for all servers, reducing the number of image files, preventing a plurality of image files from taking up much storage space, thereby saving storage space.

Figure 9:
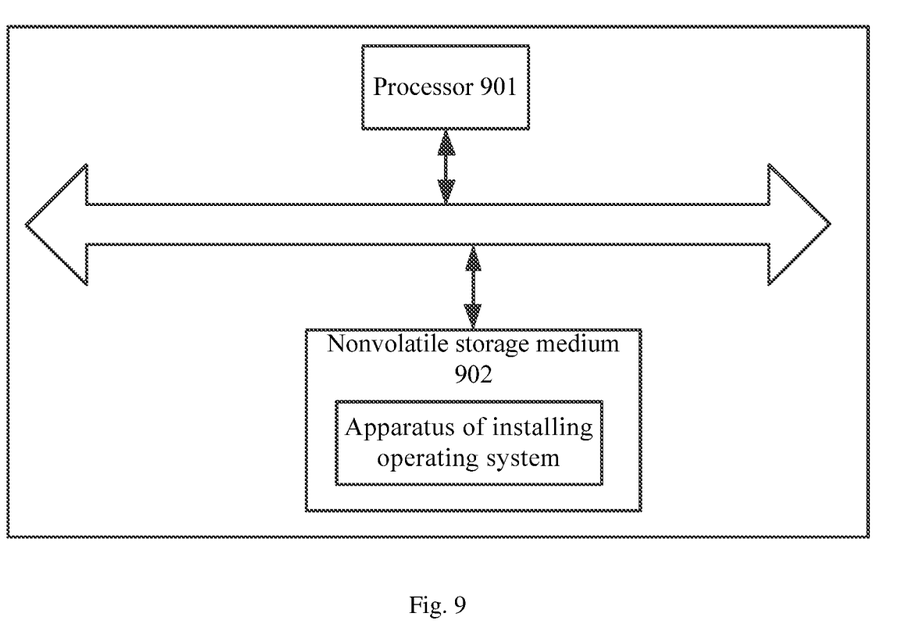
FIG. 9 is a hardware structure diagram of a server in an example of the present disclosure.

Based on the same disclosed concept as the above method, an example of the present disclosure provides an installing apparatus of an operating system. The installing apparatus of the operating system may be applied in a server. The installing apparatus of the operating system may be implemented by software, and may also be implemented by hardware or a combination of hardware and software. The apparatus is implemented by software as an example. As a logical device, it may be formed by a processor of the server reading corresponding machine readable instructions in the non-volatile storage medium. On the hardware level, as shown in FIG. 9, it is a hardware structure diagram of the server where the installing apparatus of the operating system proposed by the present disclosure is located. In addition to the processor 901 and the nonvolatile storage medium 902 shown in FIG. 9, the server may also comprise other hardware, such as forwarding chips which are responsible for handling packets, network interfaces, memories, etc.; with respect to the hardware structure, the server may also be a distributed device, which may comprise a plurality of interface cards so as to perform expansion on packet processing on the hardware level.

Figure 10:
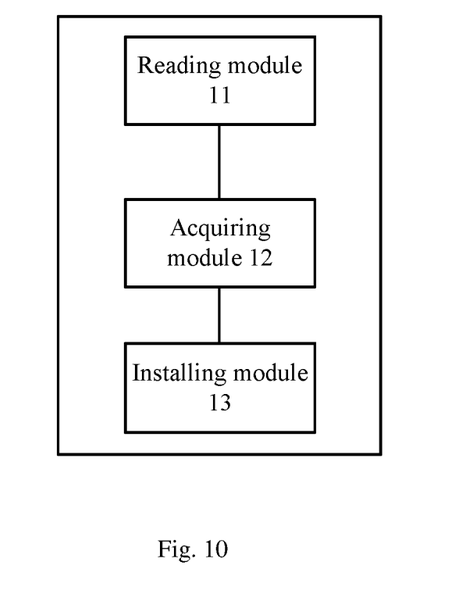
FIG. 10 is a structure diagram of an apparatus of installing operating system in an example of the present disclosure.

As shown in FIG. 10, it is a structure diagram of an apparatus of installing operating system proposed by the present disclosure. The apparatus of installing operating system specifically comprises a reading module 11 configured to read an image file of an operating system from a system providing device, wherein the image file comprises address information of an automatic response script file, and the automatic response script file is not stored at a position corresponding to the address information; an acquiring module 12 configured to receive the automatic response script file which is provided by the system providing device responding to that the reading by the server advances to the position corresponding to the address information; and an installing module 13 configured to install the operating system by using the automatic response script file.

In an example of the present disclosure, the address information of the automatic response script file in the image file read by the reading module 11 comprises a file header address and a file size of the automatic response script file.

During the process of reading the image file, the reading module 11 may send identification information of the server and the current reading position information to the system providing device so that the system providing device acquires the automatic response script file corresponding to the identification information when the current reading position information indicates that the reading by the server is advancing to the position corresponding to the address information.

Various modules of the apparatus of the present disclosure may be integrated or deployed separately. The above modules may be combined into one module, or they may be further split into a plurality of sub-modules.

Figure 11:
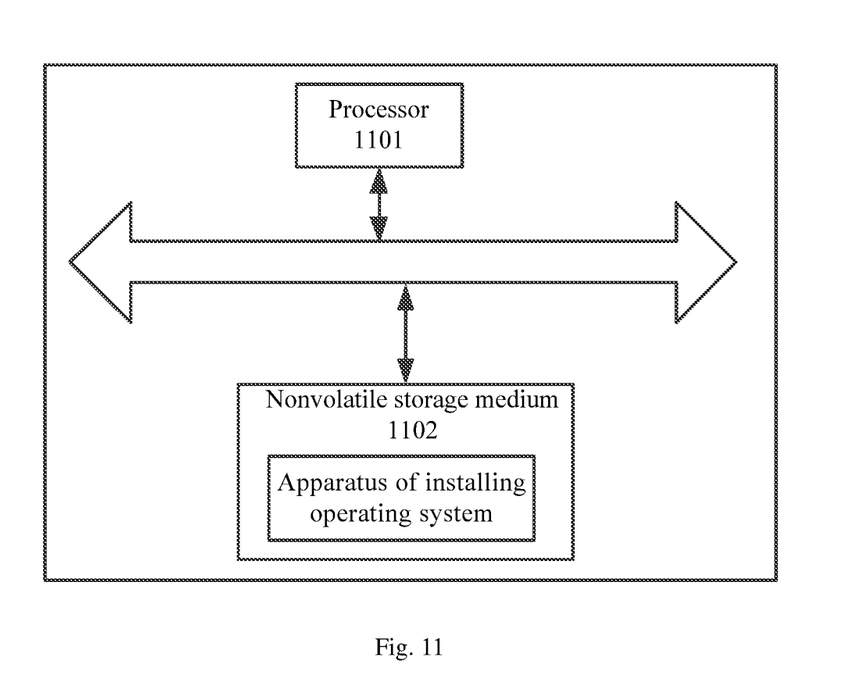
FIG. 11 is a hardware structure diagram of a system providing device in an example of the present disclosure.

Based on the same disclosed concept as the above method, an example of the present disclosure also provides an apparatus of installing operating system. The apparatus of installing operating system may be applied to a system providing device (such as a PC and the like), wherein the apparatus of installing operating system may be implemented by software, and may also be implemented by hardware or a combination of hardware and software. The apparatus is implemented by software as an example. As a logical device, it may be formed by a processor of the system providing device reading the machine executable instructions corresponding to the non-volatile storage medium. On the hardware level, as shown in FIG. 11, it is a hardware structure diagram of a system providing device where an apparatus of installing operating system proposed by the present disclosure is located. In addition to the processor 1101 and the nonvolatile storage medium 1102 shown in FIG. 11, the system providing device may also comprise other hardware, such as forwarding chips which are responsible for handling packets, network interfaces, memories, etc. On the hardware level, the system providing device may also be a distributed device, which may comprise a plurality of interface cards so as to perform expansion on packet processing on the hardware level.

Figure 12:
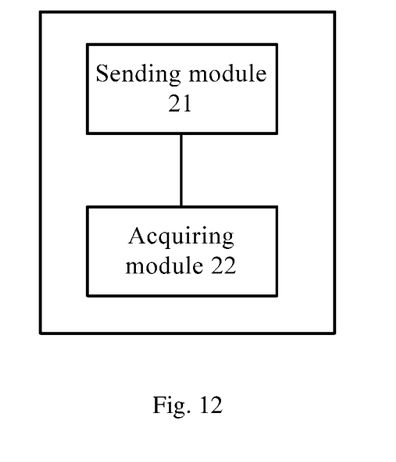
FIG. 12 is a structure diagram of an apparatus of installing operating system in an example of the present disclosure.

As shown in FIG. 12, it is a structure diagram of an apparatus of installing operating system proposed by the present disclosure, comprising:

a sending module 21 configured to provide an image file of an operating system to a server, wherein the image file comprises address information corresponding to an automatic response script file, and the automatic response script file is not stored at the position corresponding to the address information; and an acquiring module 22 configured to acquire the automatic response script file in response to that the reading by the server advances to the position corresponding to the address information of the automatic response script file.

The sending module 21 further provides the automatic response script file acquired by the acquiring module 22 to the server so that the server installs the operating system by using the automatic response script file.

In an example of the present disclosure, the address file corresponding to the automatic response script file in the image file sent by the sending module 21 comprises the file header address and the file size of the automatic response script file.

In an example of the present disclosure, the acquiring module 22 may determine whether the reading by the server is advancing to the position corresponding to the address information based on the identification information of the server and the current reading position information which are received from the server. If so, the acquiring module 22 may acquire the automatic response script file corresponding to the identification information according to the mapping relationship between the server and the automatic response script file.

The acquiring module 22 may acquire an offset header address and an content length of the currently read content using the current reading position information; and determine that the reading by the server is advancing to the position corresponding to the address information when the offset header address is greater than or equal to the file header address and the sum of the content length and the offset header address is equal to or less than the sum of the file header address and the file size.

The apparatus of installing operating system further comprises (not shown in the figure) a maintaining module configured to maintain the mapping relationship between the identification information of the plurality of servers and the automatic response script file when the plurality of servers use the same automatic response script file; or maintain the mapping relationship between the identification information of each server and its corresponding automatic response script file, respectively, when the plurality of servers use different automatic response script files.

Various modules of the apparatus of the present disclosure may be integrated or deployed separately. The above modules may be combined into one module, or they may be further split into a plurality of sub-modules.

By the above description of the examples, it will be apparent to those skilled in the art that the present disclosure may be implemented by means of software plus a necessary general hardware platform, and of course, it may be implemented by hardware, but in many cases, the former is a better implementation. Based on this understanding, the technical solution of the present disclosure, in essence, or the part contributing to the prior art, may be embodied in the form of a software product. The computer software product may be stored in a storage medium, comprising several instructions so that a computer apparatus (which may be a personal computer, a server, or a network device, etc.) performs the methods described in the various examples of the present disclosure. It will be understood by those skilled in the art that the drawings are merely schematic diagrams of a preferred example and that the modules or flows in the drawings are not necessarily essential to the implementation of the present disclosure.

The terms used in the present disclosure are merely for the purpose of describing a particular example and are not intended to be limiting of the present disclosure. A singular form, such as "a", "the" and "this" as used in this disclosure and the claims, is also intended to comprise a plural form, unless the context clearly indicates otherwise. It is also to be understood that the term "and/or" as used herein refers to any or all of possible combinations that comprise one or more associated listed items.

It should be understood that although various information may be described in the terms such as a first, a second, a third, etc. in this disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, and the used word "if" may be interpreted as "when", "as" or "in response to determining".

It will be understood by those skilled in the art that the modules in the apparatus in an example may be distributed in the apparatus of the example according to the description of the example, or may be correspondingly modified in one or more apparatus different from the present example. The modules of the above example may be combined into one module, or they may be further split into a plurality of sub-modules. The above examples of the present disclosure are for illustrative purposes only and are not representative of good or bad examples.

The foregoing disclosed content is only a few specific examples of the present disclosure, but the present disclosure is not limited thereto, and any changes that occur to those skilled in the art should fall within the scope of protection of the present disclosure.

The invention claimed is:

1. A method of installing operating system, comprising:
    reading, by a server, an image file of an operating system from a system providing device, wherein the image file comprises address information of an automatic response script file, and the automatic response script file is not stored at a position corresponding to the address information, and wherein the system providing device maintains a mapping relationship between the server and the automatic response script file, when reading the image file, the server sends identification information of the server and current reading position information to the system providing device, so that the system providing device acquires the automatic response script file corresponding to the identification information when the current reading position information indicates that the reading by the server advances to the position corresponding to the address information;
    receiving, by the server, the automatic response script file which is provided by the system providing device in response to that the reading by the server advances to the position corresponding to the address information and based on the mapping relationship; and installing, by the server, the operating system by using the automatic response script file.

2. The method according to claim 1, wherein the address information of the automatic response script file comprises a file header address and a file size of the automatic response script file.

3. The method according to claim 1, wherein, the image file comprises an ISO image file.

4. A method of installing operating system, comprising:
providing, by a system providing device, an image file of an operating system to a server, wherein the image file comprises address information of an automatic response script file, and the automatic response script file is not stored at a position corresponding to the address information, and wherein the system providing device maintains a mapping relationship between the server and the automatic response script file;

acquiring, by the system providing device, the automatic response script file in response to that the reading by the server advances to the position corresponding to the address information of the automatic response script file and based on the mapping relationship, wherein, acquiring the automatic response script file in response to that the reading by the server advances to the position corresponding to the address information of the automatic response script file, comprises: determining, by the system providing device, whether the reading by the server advances to the position corresponding to the address information based on identification information of the server and current reading position information which are received from the server; and acquiring, by the system providing device, the automatic response script file corresponding to the identification information according to a mapping relationship between server and automatic response script file in a case that the current reading position information indicated that the reading by the server advances to the position corresponding to the address information, and providing, by the system providing device, the automatic response script file to the server so that the server installs the operating system by using the automatic response script file.

5. The method according to claim 4, wherein the address information of the automatic response script file comprises a file header address and a file size of the automatic response script file.

6. The method according to claim 4, wherein, determining whether the reading by the server advances to the position corresponding to the address information based on identification information of the server and current reading position information which are received from the server, comprising:

acquiring, by the system providing device, an offset header address and a content length of content to be read by the server, according to the current reading position information; and determining, by the system providing device, that the reading by the server is advancing to the position corresponding to the address information when the offset header address is greater than or equal to the file header address and a sum of the content length and the offset header address is equal to or less than a sum of the file header address and the file size.

7. The method according to claim 4, wherein, the image file comprises an ISO image file.

8. An apparatus of installing operation system, comprising:
a processor;
a non-transitory storage medium storing with machine executable instructions,
wherein, by executing the machine executable instructions, the processor is caused to:
read an image file of an operating system from a system providing device, wherein the image file comprises address information of an automatic response script file, and the automatic response script file is not stored at a position corresponding to the address information, and wherein the system providing device maintains a mapping relationship between the apparatus and the automatic response script file, wherein when reading the image file, the machine executable instructions further cause the processor to: send identification information of the server and current reading position information to the system providing device so that the system providing device acquires the automatic response script file corresponding to the identification information when the current reading position information indicates that the reading by the server advances to the position corresponding to the address information;

receive the automatic response script file which is provided by the system providing device in response to that the reading by the server advances to the position corresponding to the address information and based on the mapping relationship; and install the operating system by using the automatic response script file.

9. The apparatus according to claim 8, wherein the address information of the automatic response script file comprises a file header address and a file size of the automatic response script file.

10. The method according to claim 8, wherein, the image file comprises an ISO image file.

* * * * *

UNITED STATES PATENT AND TRADEMARK OFFICE
CERTIFICATE OF CORRECTION

PATENT NO. : 10,977,049 B2  
APPLICATION NO. : 16/090038  
DATED : April 13, 2021  
INVENTOR(S) : Feng Shi It is certified that error appears in the above-identified patent and that said Letters Patent is hereby corrected as shown below:

On the Title Page

(73) Assignee:
Change the assignee name from "New H3C Technologies Co., Ltd." to "New H3C Information Technologies Co., Ltd."

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*